United States Patent
Zhang et al.

(10) Patent No.: US 8,817,661 B2
(45) Date of Patent: Aug. 26, 2014

(54) METHOD OF PROVIDING HAND-OFF HYSTERESIS FOR SUBNET BORDERS

(75) Inventors: Bulin Zhang, Branchburg, NJ (US); Philip Lamoureux, Succasunna, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 400 days.

(21) Appl. No.: 13/081,902

(22) Filed: Apr. 7, 2011

(65) Prior Publication Data

US 2012/0257597 A1 Oct. 11, 2012

(51) Int. Cl.
*H04W 4/00* (2009.01)

(52) U.S. Cl.
USPC .......................................... 370/254; 370/331

(58) Field of Classification Search
None
See application file for complete search history.

(56) References Cited

U.S. PATENT DOCUMENTS

| | | | | |
|---|---|---|---|---|
| 6,091,959 | A | * | 7/2000 | Souissi et al. ................. 340/7.46 |
| 6,278,881 | B1 | * | 8/2001 | Balck ............................. 455/444 |
| 7,890,103 | B2 | * | 2/2011 | Shinozaki ................... 455/435.1 |
| 2006/0206597 | A1 | * | 9/2006 | Kim et al. ...................... 709/220 |
| 2011/0077014 | A1 | * | 3/2011 | Heavilin et al. ............... 455/446 |
| 2012/0063367 | A1 | * | 3/2012 | Curtis et al. ................... 370/270 |
| 2012/0157105 | A1 | * | 6/2012 | Grob-Lipski ................. 455/437 |

* cited by examiner

*Primary Examiner* — Gregory Sefcheck
*Assistant Examiner* — Daniel Mitchell
(74) *Attorney, Agent, or Firm* — Harness, Dickey & Pierce, P.L.C.

(57) ABSTRACT

In one embodiment, at least one grouping message is broadcast from a network element. The grouping message causes an access terminal (AT) in the communications network to regard the at least first and second subnets as both being members of a same subnet group. Location information and a maximum distance parameter associated with at least one area and configured to create a buffer zone along a border between the first and second subnets are broadcasted from the network element to the AT. The AT is prevented from sending a subnet identifier request message when the AT has, as an origin area, an area of the first subnet in the buffer zone and the AT travels to an area of the second subnet in the buffer zone. Session transfers are performed outside the buffer zone triggered by distance based location update messages, thus preventing session transfer ping-ponging.

9 Claims, 11 Drawing Sheets

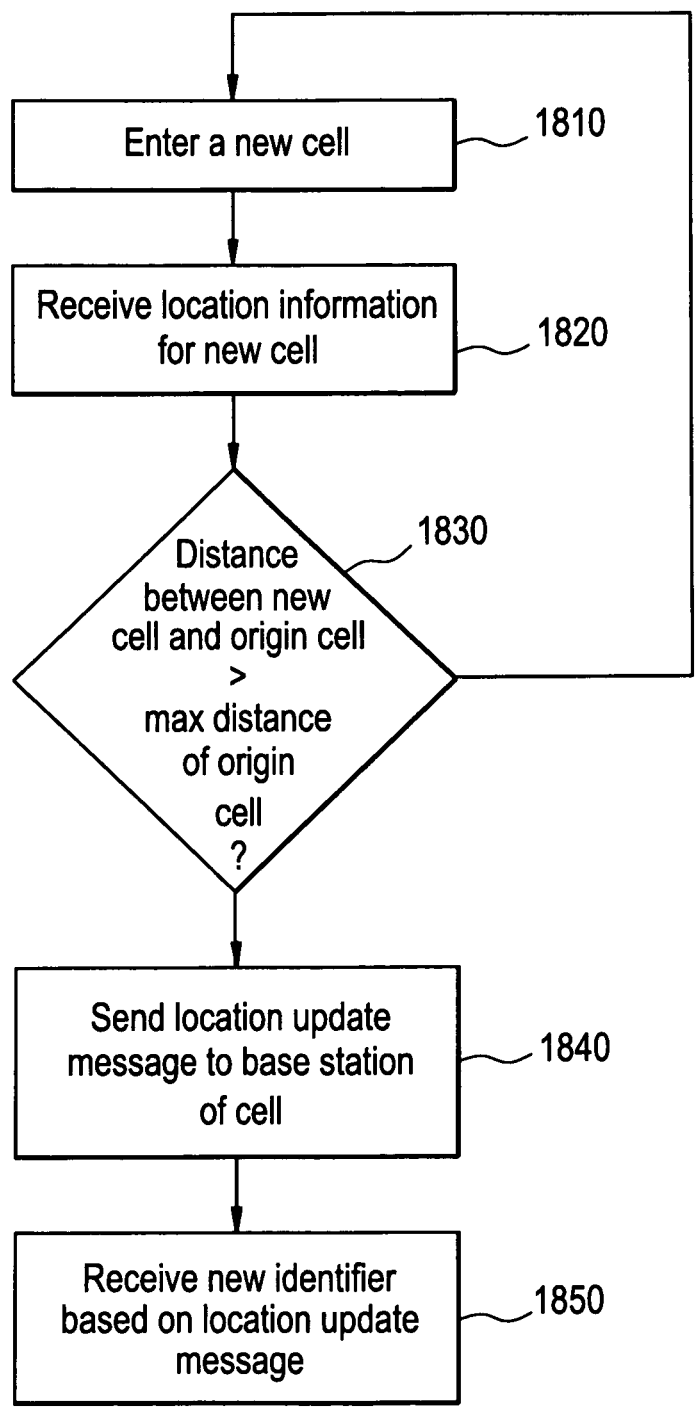

METHOD OF PROVIDING HAND-OFF HYSTERESIS FOR SUBNET BORDERS

BACKGROUND OF THE INVENTION

1. Field

Example embodiments relate generally to operating communications networks having multiple subnets.

2. Related Art

Wireless communications networks provide wireless coverage for access terminals (ATs) traveling within geographical areas covered by the communications network. The area covered by the communications can be divided into cells, each cell is provided with wireless coverage by a base station (BS). Each BS can be controlled by a controller like an radio network controller (RNC). BSs connected to an RNC and cells for which those BSs provide coverage define a subnet. When an AT moves from a cell in one subnet to a cell in another, a hand-off operation may be performed so the AT is properly associated with the new subnet.

SUMMARY

Example embodiments are directed to methods of providing a buffer zone for hand-offs between subnet borders.

According to an example embodiment, a method of operating a communications network including a plurality of areas divided into at least a first and second subnet includes broadcasting, from a network element, at least one grouping message causing an access terminal (AT) in the communications network to regard the at least first and second subnets as both being members of a same subnet group. Location information and a maximum distance parameter associated with at least one area from among the plurality of areas is broadcasted from the network element to the AT. The grouping message and the maximum distance parameter are configured to create a buffer zone along a border between the first and second subnets. The AT is prevented from sending a subnet identifier request message when the AT has, as an origin area, an area of the first subnet in the buffer zone and the AT travels to an area of the second subnet in the buffer zone.

According to en example embodiment, a method of paging an access terminal (AT) in a communications network including a plurality of areas includes receiving at a controller a location update message from the AT indicating an area, from among the plurality of areas, in which the AT is located; and paging the AT by determining, at the controller, a radius value based on the location update message, and sending at least one paging message to one or more areas, from among the plurality of areas, within a region defined by the area indicated in the location update message and the determined radius.

According to an example embodiment, a method of operating a first controller in a communications network including a plurality of areas divided into at least a first and second subnet includes receiving a location update message at the first controller, the first controller being associated with the first subnet, the location update message including access terminal (AT) identification information and controller identification information; determining if the controller identification information indicates a second controller different from the first controller; and if the controller identification information identifies the second controller, forwarding the location update message to the second controller, and receiving, from the second controller, session information associated with the AT, in response to the forwarding of the location update message.

According to an example embodiment, a method of operating a first controller in a communications network including a plurality of areas divided into at least a first and second subnet includes receiving a location update request at the first controller, the first controller being associated with the first subnet, the location update message including access terminal (AT) identification information; determining whether the location update message was received from a second controller different from the first controller; and if the location information message was received from the second controller, determining, at the first controller, session information for the AT indicated by the AT identification information, and forwarding, to the second controller, the session information associated for the AT, in response to receipt of the location update message.

According to an example embodiment, a controller device for facilitating communications in a communications network including a plurality of areas divided into at least a first and second subnet, the controller device includes a receiver unit configured to receive data from other network elements of the communications network; a transmitting unit configured to transmit data to other network elements of the communications network; a memory unit configured to store at least address information associated with other controllers in the communications network; and a processing unit coupled to the transmitting unit, the receiving unit, and the memory unit. The processing unit is configured to control operations including receiving a location update message at the first controller, the first controller being associated with the first subnet, the location update message including access terminal (AT) identification information and controller identification information; determining if the controller identification information indicates a second controller different from the first controller; and if the controller identification information identifies the second controller, forwarding the location update message to the second controller, and receiving, from the second controller, session information associated with the AT, in response to the forwarding of the location update message.

According to an example embodiment, a controller device for facilitating communications in a communications network including a plurality of areas divided into at least a first and second subnet, the controller device includes a receiver unit configured to receive data from other network elements of the communications network; a transmitting unit configured to transmit data to other network elements of the communications network; a memory unit configured to store at least session information for access terminals (ATs) associated with the controller, and address information associated with other controllers in the communications network; and, a processing unit coupled to the transmitting unit, the receiving unit, and the memory unit. The processing unit is configured to control operations including receiving a location update request at the first controller, the first controller being associated with the first subnet, the location update message including AT identification information; determining whether the location update message was received from a second controller different from the first controller; and if the location information message was received from the second controller, determining, at the first controller, session information for the AT indicated by the AT identification information, and forwarding, to the second controller, the session information associated for the AT, in response to receipt of the location update message.

According to an example embodiment, a method of operating an access terminal (AT) in a communications network including a plurality of areas divided into at least a first and second subnet includes moving from a first cell in the first subnet to a cell in the second subnet; receiving, at the AT, location information associated with the second cell; performing a comparison operation based on the location information of the second cell and location information of the first cell stored in the AT; and based on the comparison, sending, from the AT, a location update message to a network element in the second cell, and receiving, at the AT, a subnet identifier associated with the second subnet.

BRIEF DESCRIPTION OF THE DRAWINGS

Example embodiments of the present invention will become more fully understood from the detailed description provided below and the accompanying drawings, wherein like elements are represented by like reference numerals, which are given by way of illustration only and thus are not limiting of the present invention and wherein:

FIG. 8C illustrates a method of operating an AT according to example embodiments.

DETAILED DESCRIPTION OF EXAMPLE EMBODIMENTS

Figure 1:
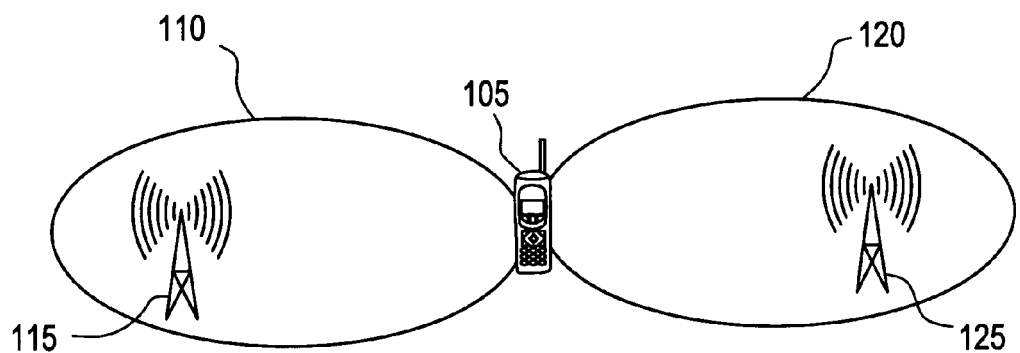
FIG. 1 illustrates a portion of a wireless communications network according to an embodiment.

Various example embodiments of the present invention will now be described more fully with reference to the accompanying drawings in which some example embodiments of the invention are shown.

Detailed illustrative embodiments of the present invention are disclosed herein. However, specific structural and functional details disclosed herein are merely representative for purposes of describing example embodiments of the present invention. This invention may, however, be embodied in many alternate forms and should not be construed as limited to only the embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the invention to the particular fauns disclosed, but on the contrary, example embodiments of the invention are to cover all modifications, equivalents, and alternatives falling within the scope of the invention. Like numbers refer to like elements throughout the description of the figures. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the invention. As used herein, the singular forms "a", "an" and "the" are intended to include the plural forms as well, unless the context clearly indicates otherwise. It will be further understood that the tee "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

As used herein, the term access terminal (AT) may be considered synonymous to, and may hereafter be occasionally referred to, as a terminal, mobile unit, mobile station, mobile user, user equipment (UE), subscriber, user, remote station, access terminal, receiver, etc., and may describe a remote user of wireless resources in a wireless communication network. The term base station (BS) may be considered synonymous to and/or referred to as a base transceiver station (BTS), NodeB, extended Node B (eNB), femto cell, access point, etc. and may describe equipment that provides the radio baseband functions for data and/or voice connectivity between a network and one or more users.

Exemplary embodiments are discussed herein as being implemented in a suitable computing environment. Although not required, exemplary embodiments will be described in the general context of computer-executable instructions, such as program modules or functional processes, being executed by one or more computer processors or CPUs. Generally, program modules or functional processes include routines, programs, objects, components, data structures, etc. that performs particular tasks or implement particular abstract data types.

The program modules and functional processes discussed herein may be implemented using existing hardware in existing communication networks. For example, program modules and functional processes discussed herein may be implemented using existing hardware at existing network elements or control nodes (e.g., a BS shown in FIG. 1 or RNC shown in FIG. 2). Such existing hardware may include one or more digital signal processors (DSPs), application-specific-integrated-circuits, field programmable gate arrays (FPGAs) computers or the like.

In the following description, illustrative embodiments will be described with reference to acts and symbolic representations of operations (e.g., in the form of flowcharts) that are performed by one or more processors, unless indicated otherwise. As such, it will be understood that such acts and operations, which are at times referred to as being computer-executed, include the manipulation by the processor of electrical signals representing data in a structured form. This manipulation transforms the data or maintains it at locations in the memory system of the computer, which reconfigures or otherwise alters the operation of the computer in a manner well understood by those skilled in the art.

FIG. 1 illustrates a portion of a wireless communications network 100. Wireless communications network 100 may follow a code division multiple access (CDMA) evolution data optimized (EVDO) protocol. Referring to FIG. 1, wireless communications network 100 may include an access terminal (AT) 105, and first and second base stations (BTs) 115 and 125, and first and second cells 110 and 120. First and second cells 110 and 120 may represent geographical areas within the wireless communications 100. The first base station 115 provides wireless coverage for ATs within at least a portion of a first cell 110, and the second base station 120 provides wireless coverage for ATs within at least a portion of a second cell 120. Each of the first and second BTs 110 and 120 are connected to a radio network controller (RNC). The RNCs in the communications network 100 will be discussed in greater detail below with reference to FIG. 2. Further, though not illustrated for the purpose of clarity, wireless communications network 100 may include other network elements in accordance with CDMA EVDO protocol. For example, each of the RNCs in the wireless communications network 100 may be associated with a packet data switching node (PDSN) (not illustrated) also included in wireless communications network 100.

Further, though for the purpose of simplicity, the first and second cells 110 and 120 are each illustrated as being associated with only one BS, each of the first and second cells may be spatially divided into multiple sectors, each of which may be associated with a different BS. For example, each of the first and second cells 110 and 120 can include 3-6 sectors, and each of the sectors may be associated with a different BS. Further, though, the first and second BSs 115 and 125 are each illustrated as being associated with only one cell, each of the first and second BSs 115 and 125 may be associated with sectors in multiple cells. For example, the first and second BSs 115 and 125 may each provide wireless coverage for sectors in 3-6 cells.

Figure 2:
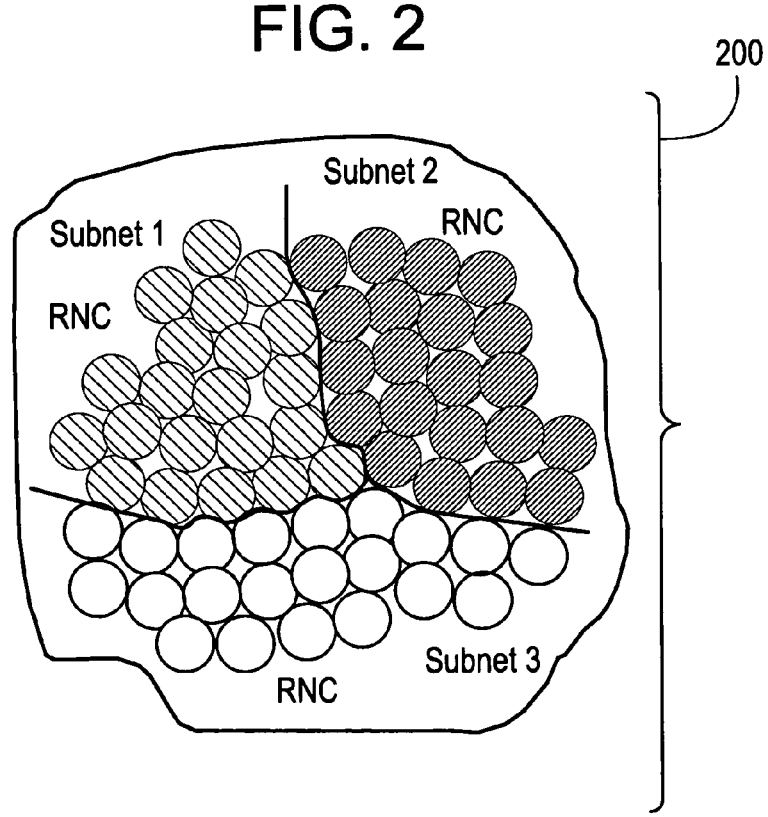
FIG. 2 illustrates a portion of the wireless communications network illustrated in FIG. 1 at a higher level.

FIG. 2 illustrates a portion of the wireless communications network 100 at a higher level than that illustrated in FIG. 1. The communications network 100 includes 3 RNCs, first RNC, RNC 1, second RNC, RNC 2 and third RNC, RNC 3. The circles illustrated in FIG. 2 each represent cells. The communications network 100 includes three groups of cells, the first group, 210, the second group, 220, and the third group, 230. Though, for the purpose of simplicity, no BSs are illustrated in FIG. 2, each of the cells in the wireless communications network 100 are provided with wireless coverage by one or more BSs in the manner described above with reference to FIG. 1. For example, in the example illustrated in FIG. 2, BSs may be located at points in between the illustrated cells. One or more RNCs and the BSs connected to those RNCs, together, may be referred to as an access network (AN). For example, first second and third RNCs, RNC 1, RNC 2 and RNC 3, together with the BSs connected thereto represent an AN 200.

Returning to FIG. 2, the cells within the wireless network 100 are divided into a plurality of subnets including a first subnet subnet1, a second subnet subnet2, and a third subnet subnet3. BSs, and the cells served by the BSs, may be assigned to subnets based on the RNCs connected to the BSs in each subnet. For example, in FIG. 2, BSs providing wireless coverage for the first group of cells 210 are connected the first RNC, RNC 1; BSs providing wireless coverage for the second group of cells 220 are connected to the second RNC, RNC 2; and BSs providing wireless coverage for the third group of cells 230 are connected to the third RNC, RNC 3. In the example illustrated in FIG. 2, first second and third RNCs, RNC 1, RNC 2 and RNC 3 are associated with the subnet1, subnet2, and subnet 3, respectively. Accordingly, in the example illustrated in FIG. 2, the first group of cells, 210, are assigned to the first subnet, subnet1; the second group of cells, 220, are assigned to the second subnet, subnet2; and the third group of cells, 230, are assigned to the third subnet, subnet3.

In order for the communications network 100 to properly page an AT within the communications network 100, when, for example, the communications 100 needs to route a call to the AT, it is important for the RNC associated with subnet in which AT located to know the location of the AT, or which cell and/or sector an AT is attached to. One method of providing this information is a route update message (RUM). ATs send RUMs to ANs of the subnets in which the ATs are located in order to notify the ANs of the AT's location. A RUM may include an identifier identifying the AT and an identifier identifying the RNC with which the AT is currently associated. The identifier identifying the AT may be, for example, a unicast access terminal identifier (UATI), and the identifier identifying the RNC may be, for example, a color code of the RNC that assigned the AT's current UATI. Color codes map to addresses of RNCs. Accordingly, color codes can be used by RNCs to determine addresses, for example, IP addresses, of other RNCs within wireless network 100. UATIs and color codes will be discussed in greater detail below. Once an AT sends an RUM, the AT stores the values of the current cell and sector in which the AT is located, and the AT considers the cell and/or sector in which the RUM was sent as the AT's originating cell and/or sector. Further, RNCs within the communications network 100 include storage capable of storing the locations of each AT which sends n RUM to the RNC.

Distance Based Registration

Communication network 100 implements distance based registration. Distance based registration dictates when an AT within the communications network sends an RUM. An AN within communications network 100, for example AN 200, broadcasts, for associated cells and/or sectors, location information and a maximum distance parameter associated with the sector. This may be accomplished by broadcasting from a BS in the AN 200 location information and a maximum distance parameter associated with the sectors and/or cells the BS is providing wireless coverage for. The AN 200 may store, for each cell and/or sector covered by the AN 200, the associated location information and maximum length parameter. This information may be stored, for example, in databases included in one or more RNCs included in the AN 200.

The location information may be, for example, longitude and latitude coordinates of a geographical position within the corresponding cell and/or sector. The maximum distance parameter may be, for example, a route update radius (RUR). The maximum distance parameter may indicate a distance in any known form of measurement including, for example, feet, meters, miles or kilometers. Once an AT sends an RUM and determines a sector and/or cell to be the originating sector and/or cell for the AT, the AT may store the maximum distance parameter being broadcast by the originating sector and/or cell.

As the AT travels throughout the communications network 100, the AT may periodically or constantly listen for the location information parameter being broadcasted in the cell and/or sector the AT is currently locate in. With distance based registration, the AT does not send an RUM each time the AT enters a new cell or sector. Instead, the AT uses the location information of the cell and/or sector the AT is currently located, referred to hereafter as the visited sector and/or cell, in order to determine a traveled distance value, where the traveled distance value is the distance between the location of the visited sector and/or cell and the location of the ATs originating cell and/or sector. The AT can then compare the traveled distance value to the maximum distance parameter of the AT's originating cell and/or sector, which is stored in the AT. For example, the AT may send an RUM only when the AT determines that the traveled distance value meets and/or exceeds the maximum distance parameter stored in the AT.

Figure 3:
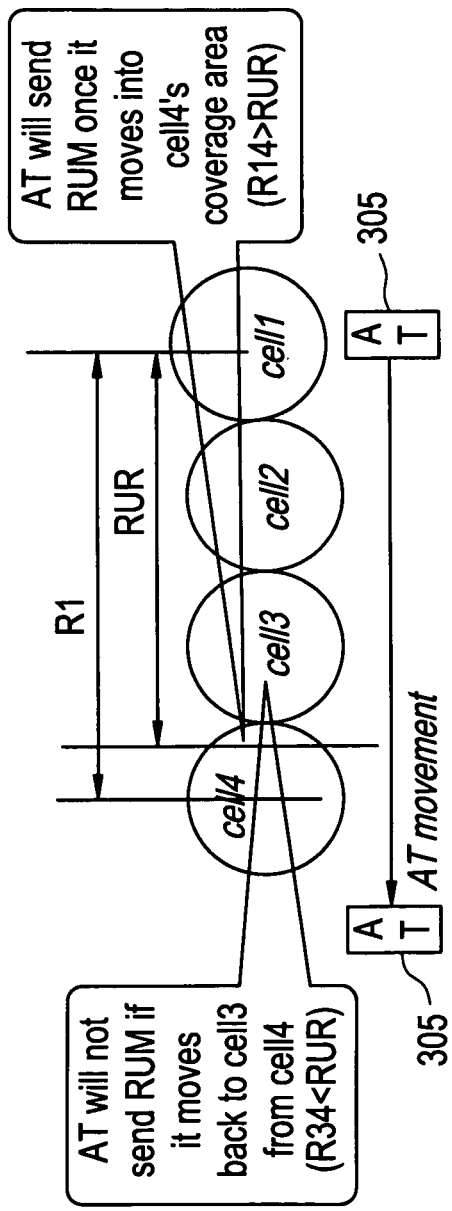
FIG. 3 illustrates an example explaining distance based registration.

FIG. 3 illustrates an example explaining distance based registration. FIG. 3 illustrates an example in which an AT 305 begins located within cell 1 and having cell 1 as its originating cell. In FIG. 3, the RUR of cell 1 is labeled as 'RUR', and the traveled distance value of the AT 305 is labeled as 'R14'. As is illustrated in FIG. 3, the AT 305 will not send an RUM while traveling through cells 2 or 3 because cells 2 and 3 are not far enough away from cell 1. Only when the AT 305 travels to cell 4 does the traveled distance value R14 exceed the RUR of cell 1. Accordingly, the AT 305 will not send an RUM until the AT 305 enters cell 4.

Session Transfer

ATs in wireless communications network 100 may constantly or periodically monitor signal strength and/or channel quality associated with the originating cell of the AT. An AT may make a decision regarding whether or not to switch from being attached to the cell to which the AT is currently attached, to being attached to another cell based on relative signal strengths of the cells. For example, an AT may decide to search for another cell to connect to if the signal strength and/or channel quality of the cell the AT is currently attached to falls below a threshold. The AT may decide which cell to connect to by, for example, choosing a cell having the highest signal strength and/or channel quality as detected by the AT. If the AT decides to connect to a cell in a different subnet from the subnet of the ATs originating cell, a session transfer takes place so the AT can register with an RNC in the new subnet.

The session transfer process may include, for example, sending a UATI request to an RNC in the new subnet. The UATI is an identifier used to route data received at the communications network 100 for an AT to the AT. Each AT in each subnet may be assigned with a UATI. UATIs in a subnet may be assigned such that the UATIs uniquely identify ATs in that subnet. Once an RNC receives the UATI request from an AT, the RNC assigns a UATI to the AT sending the request. The assigned UATI may be a UATI which uniquely identifies the AT within the subnet from which the UATI request was received. For example, referring to FIGS. 1 and 2, if the AT 105 enters the first subnet, subnet1, the AT 105 would send a UATI request to the RNC associated with subnet1, RNC1, and RNC1 would assign a UATI to the AT 105 which uniquely identifies AT 105 within the subnet1.

Figure 4:
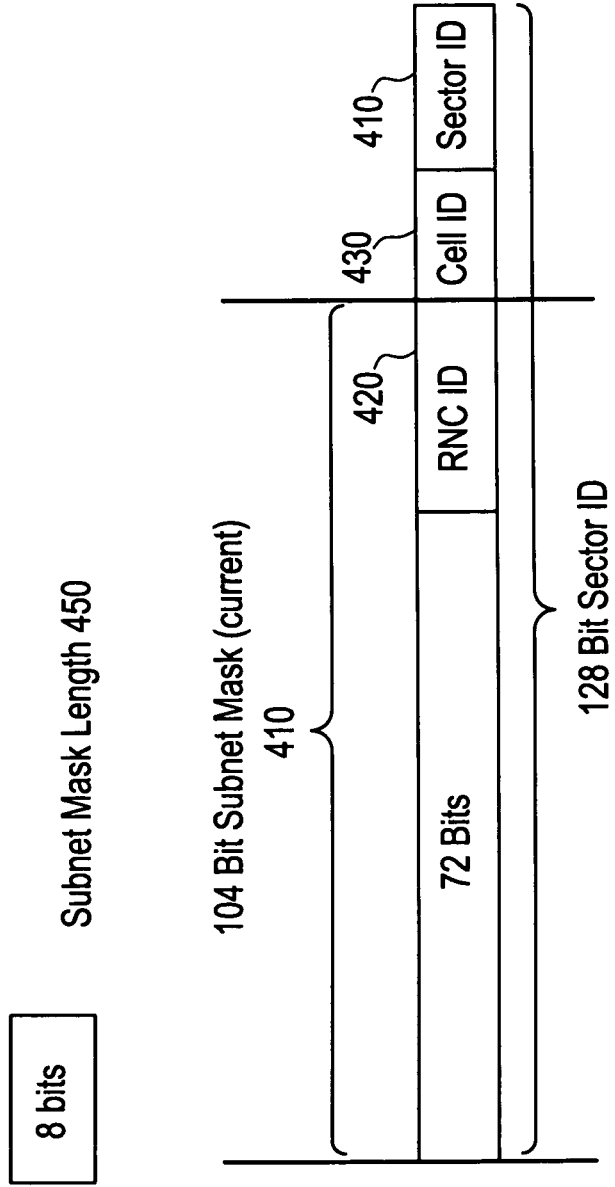
FIG. 4 illustrates an example of a subnet mask length parameter and a sector ID.

One method of determining when to perform steps associated with a session transfer including sending the UATI request includes analyzing the sector ID of the sector in which the AT is currently located. An AN in the communications network 100, for example AN 200, broadcasts a sector ID, and a subnet mask length throughout the sectors associated with the AN. A sector ID is an identifier which uniquely indentifies a particular sector in a communication network. ANs within the communications network 100 cause sector IDs to be broadcast such that each sector broadcasts a sector ID corresponding to that sector. FIG. 4 illustrates an example of a sector ID 400. Referring to FIG. 4, the sector ID 400 may be, for example, 128 bits long. The sector ID 400 includes a subnet mask 410; an RNC ID field 420, a cell ID field 430, and a sector ID field 440. The subnet mask 410 identifies the subnet of the sector from which the sector ID 400 is being broadcast, and has a length defined by the subnet mask length parameter 450, which is also broadcast by the AN. The subnet mask length parameter 450 may be, for example, 8 bits long. The subnet mask 410 may have a length of, for example, 104 bits, as indicated by the subnet mask length parameter 450. As illustrated in FIG. 4, the subnet mask 410 may have a length set to include an RNC ID field 420. The cell ID field 430 and the sector ID field 440 may identify the cell and sector from which the sector ID 400 is being broadcast, respectively.

An AT within the communications network 100 may constantly or periodically listen for sector IDs as it travels throughout communications network 100. When an AT chooses a sector and/or cell as an originating sector and/or cell by, for example, sending an RUM message in the manner discussed above, the AT may store the values included in the sector ID being broadcasted in the originating sector and/or cell. As the AT travels throughout the communications network 100, the AT compares the portion of sector ID being broadcast in each visited sector and/or cell designated by the subnet mask to a corresponding portion of the sector ID of the originating sector and/or cell, which is stored at the AT. For example, referring to FIG. 4, an AT visiting a sector in which the sector ID 400 and the subnet mask length parameter 410 are being broadcast would evaluate the subnet mask length parameter 410, and determine the subnet mask length to be 104 bits. The AT would then compare the 104 most significant bits of the sector ID being broadcast in the visited sector to the 104 most significant bits of the sector ID stored at the AT. If the AT detects difference between the portions of the two sector IDs, the AT will determine that is has entered a new subnet, and the AT will send a UATI request in the manner discussed above.

As is discussed above, an AT in the communications network 100 may make decision about switching cells based on relative signal strengths and/or channel qualities of the cell the AT is currently connected to and signal strengths of neighboring cells. A signal strength and/or channel quality of a particular cell as detected by an AT can change rapidly. For example, movements as trivial as a user rotating their boy 180 degrees or walking behind a building can drastically change the relative signal strengths and/or channel qualities of cells as detected by the AT. Accordingly, for ATs located near a boundary between two subnets, the AT may switch back and forth between being attached cells of the different subnets rapidly.

This effect may be referred to as ping-ponging. Each time the AT switches between subnets, the AT will need to send a RUM and request a UATI in the manner discussed above. This behavior can have a number of undesirable consequences including wasting access channel capacity, creating noise rise which impacts traffic data rate, wasting battery power of the AT, session transfer failures, an increase in the processing loads experienced at RNCs and PDSNs within their communications network 100, and paging failures near the border. These consequences can increase the amount resources necessary for the communications network 100 to operate while reducing the quality of service experienced by its users.

Secondary Color Code Scheme

Figure 5:
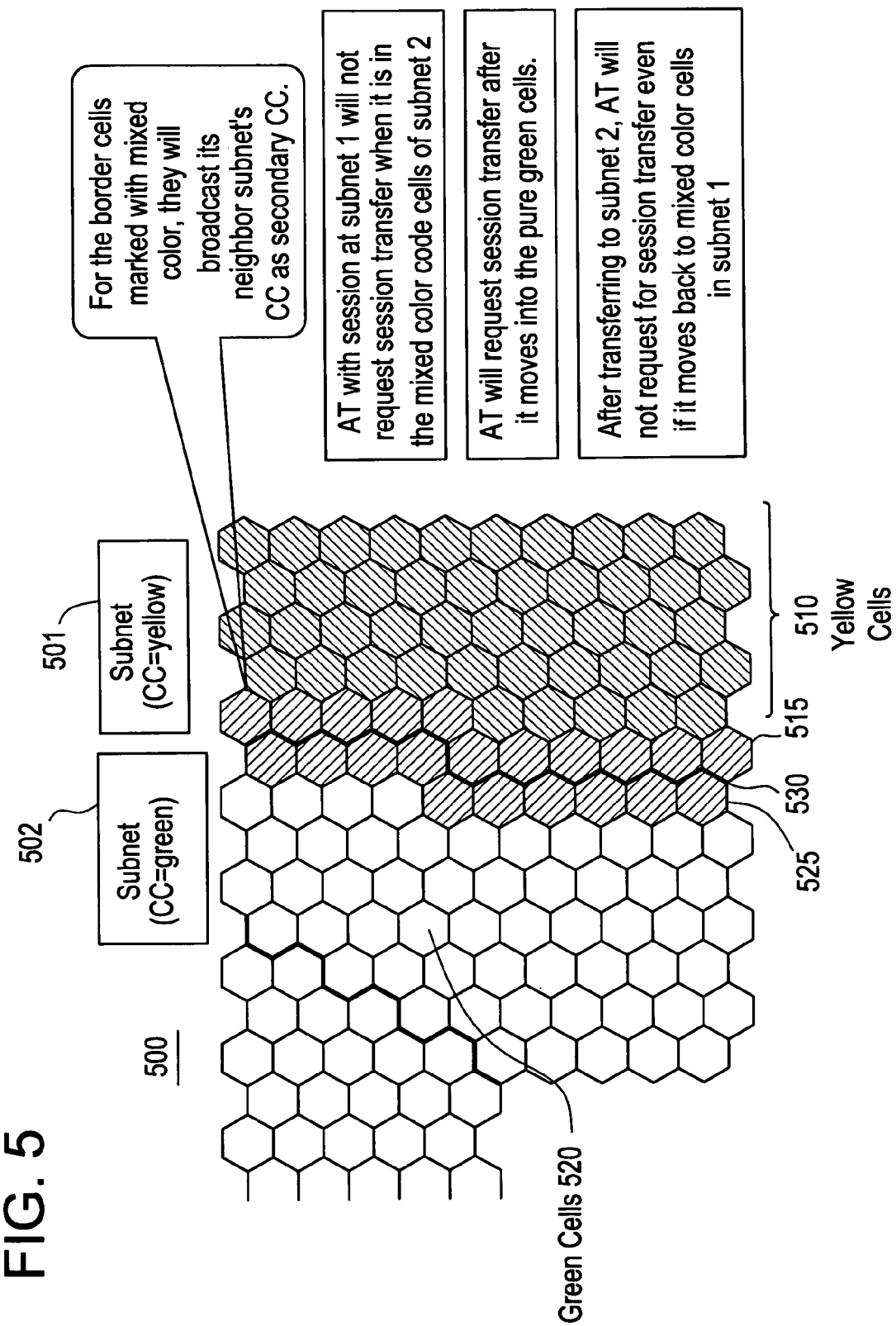
FIG. 5 illustrates an example of a secondary color code scheme.

One method of addressing the ping-ponging problem proposed as an addition to the CDMA EVDO standards is called the secondary color code scheme. FIG. 5 illustrates an example of the secondary color code scheme. FIG. 5 illustrates a portion of a wireless communications network 500. The wireless communications network 500 includes two subnets. With the secondary color code scheme, in addition to having one color code for each subnet, each subnet can include one or more cells having both a primary and a secondary color code. The wireless network 500 includes a first subnet 501 which has a primary color code of green and a second subnet 502 which has a primary color code of yellow. Accordingly, subnet 501 includes yellow cells 510, and subnet 502 includes green cells 520. The yellow subnet 501 and the green subnet 502 are separated by a border 530. The cells located along the border 530 for both the yellow subnet 501 and the green subnet 502 are mixed color cells. Mixed color cells have both a primary color code and a secondary color code.

As is illustrated in FIG. 5, the yellow subnet 501 includes yellow mixed color cells 515, and the green subnet 502 includes green mixed color cells 525. The yellow mixed color cells 515 have a primary color code of yellow and a secondary color code of green. The green mixed color cells 525 have a primary color code of green and a secondary color code of yellow. With the secondary color code scheme, an AT does not initiate a session transfer until the AT travels to cell where neither a primary color code or a secondary color code of the visited cell, if the visited cell has a secondary color code, match the primary color code of the AT's originating cell. Accordingly, ATs having originating cells that are located along the border will not initiate a session transfer until the ATs travel past the mixed color cells along the border of a neighboring subnet.

For example, an AT having, as an originating cell, one of the yellow mixed color cells 515, will not initiate a session transfer if the AT travels to one of the green mixed color cells 525 because the primary color of the AT's originating cell, yellow, matches the secondary color of the visited cell, yellow. However, if that same AT continues past the green mixed color cells 525 to one of the other green cells 520, the AT will initiate a session transfer because the primary color of the AT's originating cell, yellow, does not match the primary color of the visited cell, green, and the visited cell has no secondary color. Accordingly, the secondary color code scheme can prevent ping-ponging by eliminating the rapid-switch region along borders between subnets.

However, a large number of ATs which were already in the market before the secondary color code scheme was introduced into the CDMA EVDO standards are still in the market. Accordingly, a large number of ATs do not support the secondary color code scheme. Accordingly, for a large number of ATs, the secondary color scheme may not be effective in reducing the ping-ponging problem. Further, when implementing the secondary color code scheme, identifying border cells may be difficult.

RNC Groups

Another method of addressing the ping-ponging problem includes the use of an 'RNC Group feature'. RNC groups are groups of RNCs whose respective subnets are combined such that an AT treats the subnets of all the RNCs in the RNC group as is they are one subnet. The subnets of the RNCs in the RNC group become a subnet group. This effect may be accomplished by adjusting the subnet mask length parameter 450 broadcasted by the ANs in the communications system 100 such that the RNC ID 420 is not included in the subnet mask 410.

Figure 6:
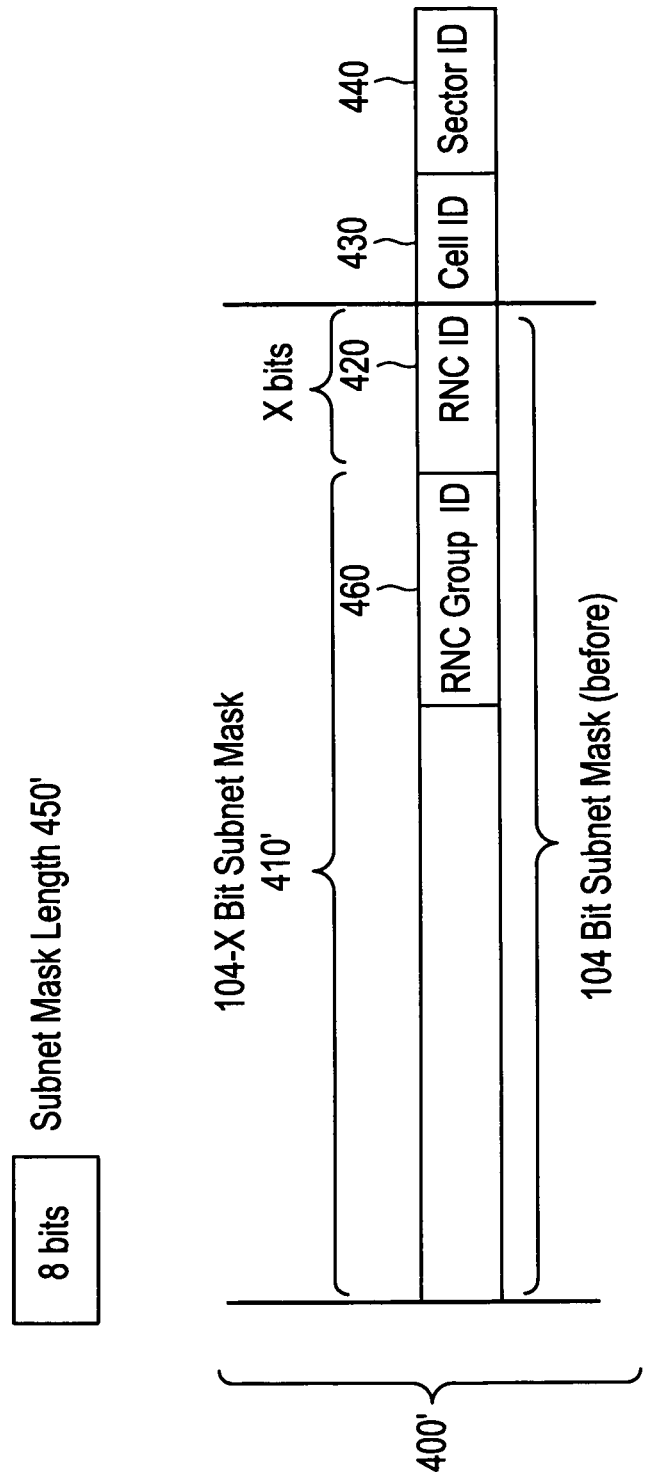
FIG. 6 illustrates a subnet mask length parameter and the sector ID according to example embodiments.

For example, FIG. 6 illustrates a subnet mask length parameter 450' and the sector ID 400' according to example embodiments. In the example illustrated in FIG. 6, the subnet mask length parameter 450' is set to indicate a subnet mask length of 104 bits−X, where X is the number of bits in the RNC ID field 420. Accordingly, in the sector ID 400', the subnet mask 410 does not include the RNC field 420. As is illustrated in FIG. 6, the subnet mask 410 does include an RNC group ID field 460. Thus, when an AT in a visited cell receives the broadcasted sector ID 400', and compares the subnet mask 410' to the corresponding bits of the subsector ID of the AT's originating cell, which is stored at the AT, the AT will not detect a difference between the two values when the AT crosses a border between subnets of RNCs in the same group. Instead, the AT will only detect a difference when that crosses an RNC group border, which may also be referred to as a subnet group border, and thus, the RNC group ID field 460 detected by the AT from the visited cell is different from the RNC group ID field 460 stored in the AT. Accordingly, the AT will only initiate session transfers when crossing RNC group borders. Thus, ping-ponging between subnets of RNCs belonging to the same RNC group can be eliminated.

One possible drawback of using RNC groups arises when an AT traveling within the RNC group needs to be paged. For example, when the communications network 100 needs to route a call to an AT within an RNC group, in order to ensure the AT is properly paged, it may be necessary to page the AT by sending paging messages to all cells covered by the RNC group. Depending on the size of the RNC group, the high volume of paging messages can use a large amount of network resources.

Combining Distance Based Registration and RNC Groups

Figure 7:
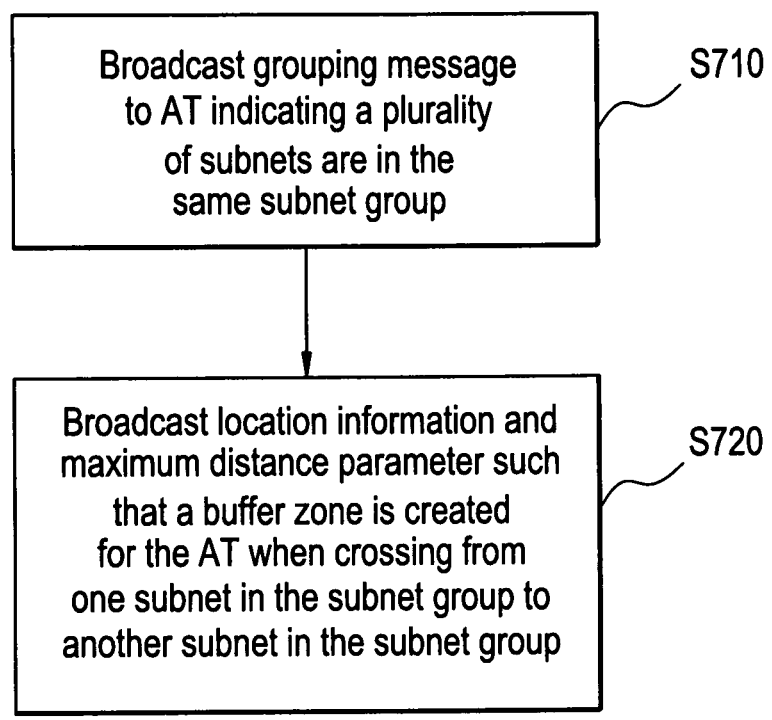
FIG. 7 illustrates method of hand-off hysteresis between subnet borders according to example embodiments.

FIG. 7 illustrates method of providing hand-off hysteresis between subnet borders according to example embodiments. The hand-off hysteresis method according to example embodiments can address both the ping-ponging and high volume paging problems discussed above by combining distance based registration with the use of RNC groups.

Referring to FIG. 7A, in step S710 a network element broadcasts a grouping message indicating that a plurality of subnets are within the same subnet group. For example, an RNC can cause BS connected to the RNC to broadcast a sector ID, which includes an RNC ID field, and a subnet mask length parameter such that the subnet mask of the sector ID includes only part of or none of the RNC ID field. This process is discussed above with reference to FIG. 6. As is discussed above with reference to FIG. 6, an AN, which includes at least one RNC and at least one BS, within the communications network 100 causes a Sector ID 400' having a subnet mask length parameter 450' set such that the subnet mask 410' does not include all or any of the RNC ID field 420, to be broadcasted in cells and/or sectors associated with the AN. Another way of expressing this effect is broadcasting mask length indicator indicating a length corresponding to a group of contiguous, most significant bits in the grouping message, not including all of the bits of the controller ID field. This may be accomplished, for example, by sending instruction from the at least one RNC to the at least one BS to broadcast the Sector ID 400'. As is described above with reference to FIG. 6, this arrangement allows for the formation of RNC groups, or subnet groups, including RNCs having subnets whose borders will not be detected by an AT. Accordingly, an AT can cross between subnets associated with the RNC group without being triggered to send an UATI request.

In step S720, a network element broadcasts location information and a maximum distance parameter for at least one sector. The grouping message and distance parameter are broadcast in such a manner that buffer zone is created within which ATs crossing from one cell or sector in a first subnet of a subnet group to a second cell or sector in an adjacent subnet of the same subnet group is prevented from sending a subnet identifier request, for example a UATI request. As is discussed above with reference to FIG. 3, an AN within the communications network 100 causes cells and/or sectors associated with the AN to broadcast location information, for example longitude and latitude, and a maximum distance parameter, for example an RUR. This may be accomplished, for example, by sending instructions from an RNC in the AN to at least one BS in the AN to broadcast the location information and the maximum distance parameter. Additionally, the BS may broadcast the location information and maximum distance parameter without instructions form the RNC. ATs within the communications network 100 use the location information and maximum distance parameter to determine when to send RUMs, in accordance with the distance based registration scheme.

According to example embodiments, ANs cause the grouping message and the maximum distance parameter to be broadcast in such a manner that a buffer zone is created within which an AT, having as an origin cell a first cell or sector in a first subnet of a subnet group that is within the buffer zone, is prevented from sending a subnet identifier request when traveling to a second cell or sector in an adjacent subnet of the same subnet group that is also in the buffer zone.

Further, even though the AT does not send a subnet identifier request when entering the adjacent subnet, according to example embodiments, a session transfer is still performed and the AT is still provided with a subnet identifier corresponding to the new subnet, based on the location update message sent by the AT outside of the buffer zone. The method of providing hand-off hysteresis between subnet borders such that a session transfer is performed based on a location update message according to example embodiments will now be discussed in greater detail below from the perspectives of an AT and a controller, for example an RNC, in FIGS. 8A-8C.

The buffer zone according to example embodiments will be discussed in greater detail below with reference to FIG. 9.

Figure 8A:
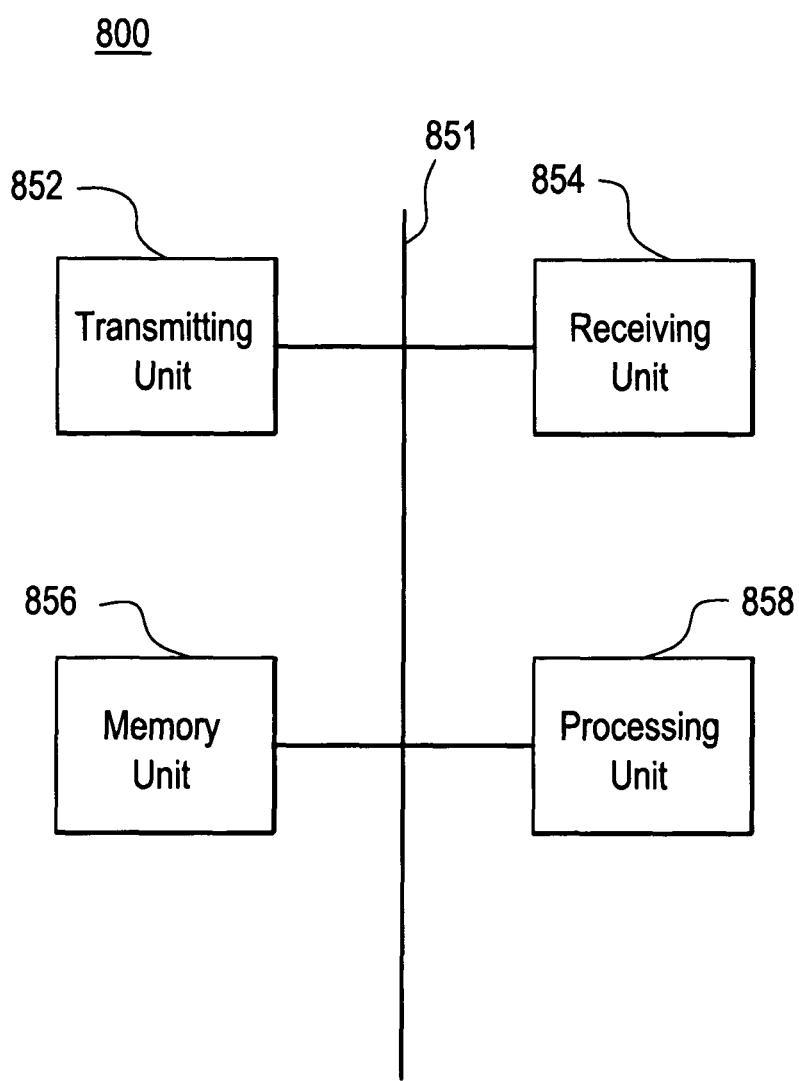
FIG. 8A is a diagram illustrating an example structure of the controller according to example embodiments.

Referring to FIG. 8A, FIG. 8A is a diagram illustrating an example structure of the controller 850 according to example embodiments. The controller 850 may be, for example, an RNC. According to example embodiments, the controller 850 may represent the structure of any of the RNCs discussed above with reference to FIGS. 1 and 2. Referring to FIG. 8A, the controller 850 may include, for example, a data bus 851, a transmitting unit 852, a receiving unit 854, a memory unit 856, and a processing unit 158. The transmitting unit 852, receiving unit 854, memory unit 856, and processing unit 858 may send data to and/or receive data from one another using the data bus 151. The transmitting unit 852 is a device that includes hardware and any necessary software for transmitting signals including, for example, data signals, control signals, via one or more wired or wireless connections to other network elements, in communications network 100, for example BSs or other controllers. The receiving unit 154 is device that includes hardware and any necessary software for receiving signals including, for example, data signals, control signals, and signal strength/quality information via one or more wired or wireless connections to other network elements in communications network 100, for example BSs or other controllers.

The memory unit 856 may be any device capable of storing data including magnetic storage, flash storage, etc. For example, the memory unit 856 is capable of storing a table of address information linking controller identifiers, for example color codes, to network addresses of other controllers in the communications network 100, for example IP address. The memory unit 856 is also capable of storing location information for ATs currently associated with a subnet serviced by the controller 850. The memory unit 856 is also capable of storing location information, for example longitude and latitude coordinates, and maximum distance parameter, for example RURs, for BSs within with a subnet serviced by the controller 850.

The processing unit 858 may be any device capable of performing calculations and processing data including, for example, a microprocessor configured to carry out specific operations based on input data, or capable of executing instructions included in computer readable code.

According to an example embodiment, each of the operations described above with respect to FIG. 7 as being preformed by an RNC, may be performed by, for example, the controller 850 structured as illustrated in FIG. 8A. For example, the memory unit 856 may store executable instructions corresponding to each of the operations discussed above with reference to FIG. 7, and the processor unit 858 may be configured to perform operations corresponding to each of the operations discussed above with reference to FIG. 7.

An example method for operating the controller 850 to participate in a session transfer based on a location update will now be discussed in greater detail below with reference to FIG. 8B.

Figure 8B:
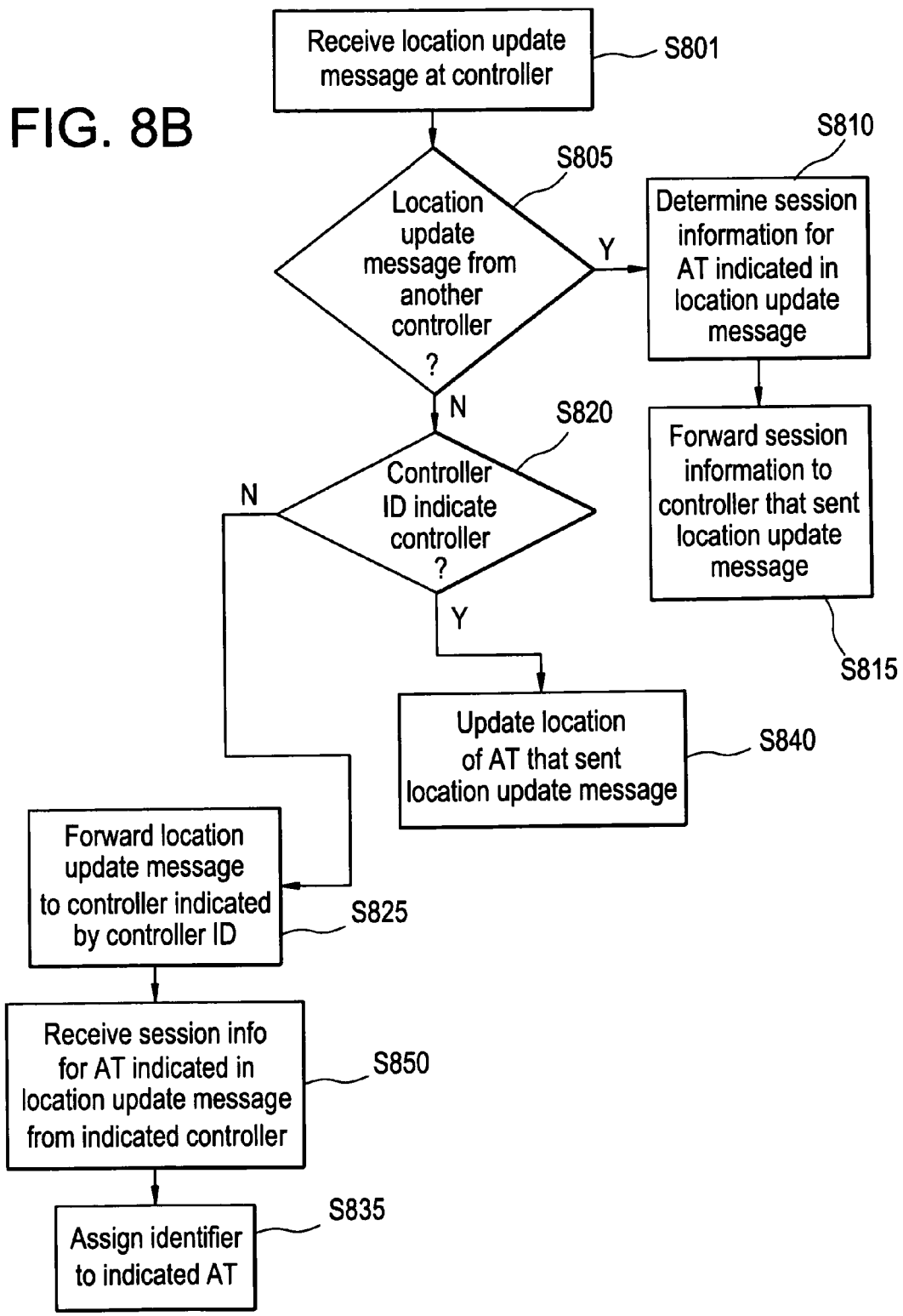
FIG. 8B illustrates a method of operating a controller according to example embodiments.

FIG. 8B illustrates a method of operating a controller according to example embodiments. According to example embodiments, the method illustrated in FIG. 8B allows a controller to facilitate hand-off hysteresis between subnet borders without the need to receive a subnet identifier request from an AT.

According to example embodiments, each of steps illustrated in FIG. 8B may be performed by, for example, the controller 850 structured as illustrated in FIG. 8A, where the memory unit 856 may store executable instructions corresponding to each of the operations illustrated in FIG. 8B, and the processor unit 858 is configured perform operations corresponding to each of the operations illustrated in FIG. 8B. The method illustrated in FIG. 8B will now be discussed with reference to the controller 850.

Referring to FIG. 8B, in step S801, the controller 850 receives a location update message. The location update message may be, for example, an RUM including an identifier identifying the AT and a controller ID identifying the controller with which the AT is currently associated like that discussed above with reference to FIG. 2.

In step S805, the controller 850 determines whether to location update message was received from another controller. According to example embodiments, the controller 850 is capable of receiving location update messages from BSs connected to the controller 850 as well as other controllers in the communications network 100. The controller 850 is capable of determining which network element forwarded the location update message, be it another controller or a BS, by, for example, examining address information associated with the location update message and/or an interface of the controller 850 through which the location update message is received.

If the controller 850 determines the location update message came from another controller, the controller 850 proceeds to step S810.

In step S810, the controller 850 determines that an AT indicated in the location update message is an AT that was once associated with the subnet of the controller 850 and has not relocated to a subnet of the controller which forwarded the location update to the controller 850. Accordingly, the controller 850 determines the session information associated with the AT indicated in the location update request and proceeds to step S815.

In step S815, the controller 850 forwards the session information determined in step S810 to the controller which sent the location update message, so the controller which sent the location update message can complete a session transfer of the AT indicated in the location update request. The controller 850 may also update the records stored at the controller 850 to indicate the AT is no longer attached to the subnet of the controller 850.

If, in step S805, the controller 850 determines the location update message did not come from another controller, the controller 850 determines that the location update message came from a BS connected to the controller 850 and proceeds to step S820.

In step S820, the controller 850 determines whether or not the controller ID included in the location update message matches the controller ID of the controller 850. For example, the controller 850 may compare its own color code to a color code included in the location update message.

If, in step S820, the controller 850 determines the controller identification information included in the location update message does not indicate the controller 850, or match the controller 850's own controller identification, the controller 850 proceeds to step S825.

In step S825 the controller 850 determines that it has received a location update message from an AT that has traveled into the subnet of the controller 850 from a different subnet associated with the controller indicated by the controller ID in the location update message. Accordingly, the controller 850 forwards the location update message to the controller indicated by controller ID in the location update message.

In step S830, in response to forwarding the location update message to the controller identified by the controller ID in the location update message, the controller 850 receives session information for the AT indicated in the location update message. The session information may be received from, for example, the controller indicated by the controller ID in the location update message.

In step S835, the controller 850 assigns a subnet identifier associated with the subnet of the controller 850, for example a UATI, to the AT indicated in the location update message. Accordingly, the controller 850 is capable of performing a session transfer of the AT with the controller indicated by the controller ID in the location update message, and assigning a new subnet identifier to the AT, based on forwarding the location update message, without receiving a subnet identifier request, for example a UATI request, from the AT. The controller 850 may also update the records stored at the controller 850 to indicate the AT is now attached to the subnet of the controller 850.

If, in step S820, the controller 850 determines the controller identification information included in the location update message does indicate the controller 850, or match the controller 850's own controller identification, the controller 850 proceeds to step S840.

In step S840, the controller 850 determines the location update message is received from a BS in the subnet of the controller 850 from an AT currently attached to the subnet of the controller 850 and updates the location information stored at the controller 850 for the AT indicated in the location update message.

An example method for operating an AT to participate in a session transfer based on a location update will now be discussed in greater detail below with reference to FIG. 8C.

FIG. 8C illustrates a method of operating an AT according to example embodiments. The method illustrated in FIG. 8C will be explained with reference to a scenario in which an AT moves between cells of two subnets having RNCs included in the same RNC group. The RNC associated with the originating subnet to which the AT is initially attached will be referred to as the originating RNC and the RNC associated with the new subnet to which the AT travels will be referred to as the new RNC.

Referring to FIG. 8C, in step S1810 the AT moves from a cell in the originating subnet to which it is initially attached to a new cell in the new subnet.

In step S1820, the AT receives location information broadcast from the new cell indicating a location of the new cell. The location information may be, for example, longitude and latitude coordinates associated with a geographical position of the cell as is discussed above with reference to FIG. 3.

In step S1830, the AT determines a traveled distance by calculating the distance between the location information of the AT's originating cell and the geographical information being broadcast in the new cell. The AT then performs a comparison based on the traveled distance and the maximum distance associated with the originating cell of the AT. The location information and maximum distance of the originating cell of the AT may both be stored in the AT.

If, in step S1830, the AT determines the traveled distance does not exceed the maximum distance associated with the AT's originating cell, the AT returns to step S1810 the next time the AT enters a new cell.

If, in step S1830, the AT determines the traveled distance exceeds the maximum distance associated with the AT's originating cell, the AT proceeds to step S1840.

In step S1840, the AT sends a location update message to a BS associated with the new cell. The location update message may be, for example, an RUM including an identifier identifying the AT and a controller ID identifying the controller with which the AT is currently associated like that discussed above with reference to FIG. 2.

Because the new cell is in the new subnet, the location update message will be sent to a BS in the new subnet, and the BS will forward the location update message to the new RNC. Further because the new RNC and the originating RNC both operate in the manner discussed above with reference to FIG. 8B, the new RNC will forward the location update message to the originating RNC. In response, the originating RNC will forward the session information for the AT to the new RNC.

Next, in step S1850, the AT will receive a subnet identifier associated with the new subnet. The subnet identifier may be, for example, a UATI. Thus, according to example embodiments, the AT can receive a new subnet identifier when entering a new subnet, without sending a subnet identifier request, for example a UATI request.

Example Operation of Method of Providing Hand-Off Hysteresis for Subnet Borders

Figure 9:
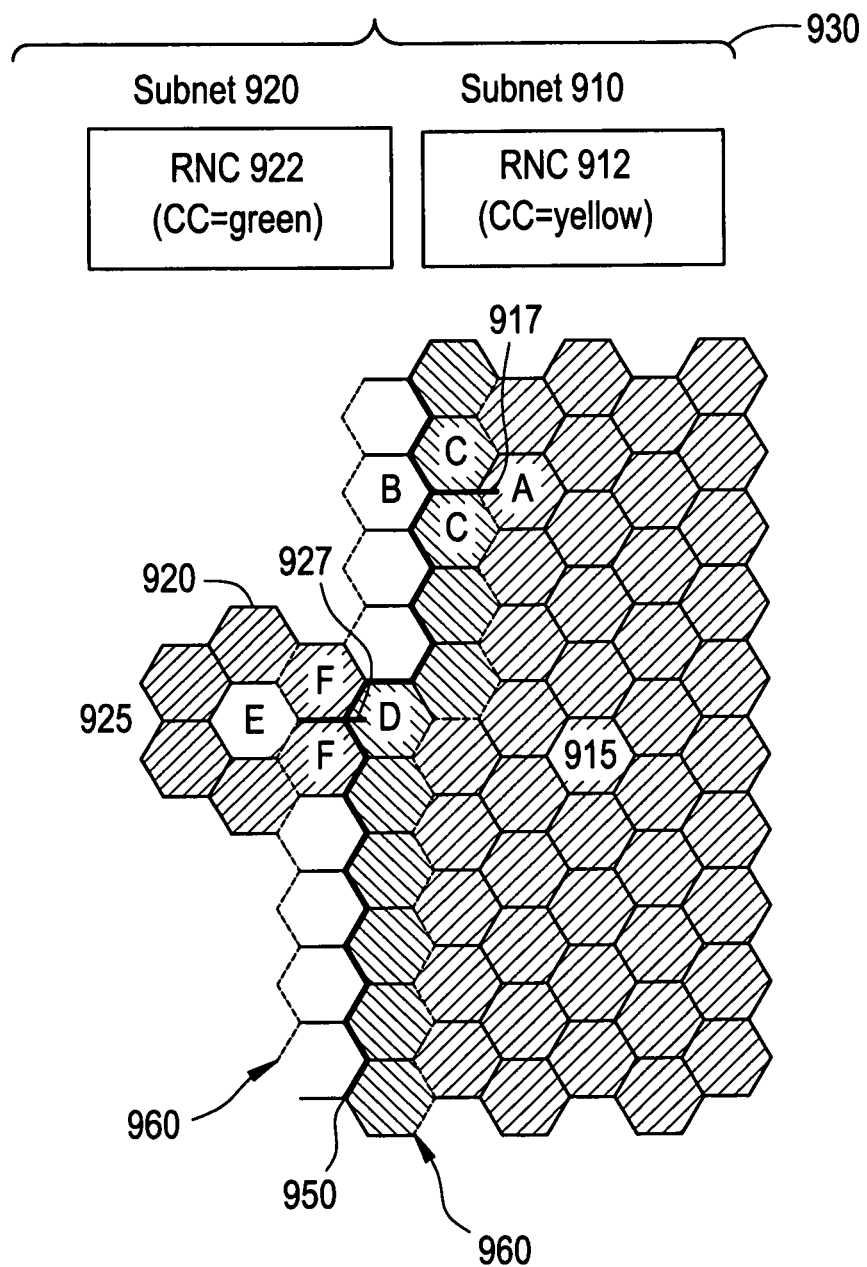
FIG. 9 is an illustration for explaining an example operation of the method of providing hand-off hysteresis for subnet borders according to example embodiments.

FIG. 9 is an illustration for explaining an example operation of the method of providing hand-off hysteresis for subnet borders according to example embodiments.

FIG. 9 illustrates a wireless communications network 900 including a first subnet 910 and a second subnet 920. The first subnet 910 has a color code of yellow, and the second subnet 920 has a color code of green. The first subnet 910 includes a first RNC 912 and yellow cells 815; and the second subnet 920 includes a second RNC 922 and green cells 925. Though, for the purpose of simplicity, no BSs are illustrated in FIG. 2, each of the cells in the wireless communications network 100 are provided with wireless coverage by one or more BSs in the manner described above with reference to FIG. 1. BSs in the first subnet 910 are connected to the first RNC 912; and BSs in the second subnet 920 are connected to the second RNC 922. The RNCs 912 and 922 may both have the structure and operation of the controller 850 discussed above with reference to FIGS. 8A and 8B. As is illustrated in FIG. 9, the first subnet 910 and the second subnet 920 are separated by a border 950. Further, as is described above with reference to FIG. 6, first RNC 912 and second RNC 922 are both part of RNC group 930.

An example operation of the method of providing hand-off hysteresis for subnet borders according to example embodiments will now be discussed with reference to cells A-F and AT 905 illustrated in FIG. 9. As is illustrated in FIG. 9, cells A, C, D and F are yellow cells, and cells B and E are green cells. Cells B, C, D and F are located along the border 950. FIG. 9 illustrates a first RUR 917, and a second RUR 927. In the example illustrated in FIG. 8, each of the yellow and green cells 915 and 925 have the same RUR. However, according to example embodiments, each cell in the wireless network 900 may have a different RUR. RURs may be set independently for each cell in accordance with a network operator's preferences.

Referring to cell D, if the AT 905 has as an originating cell, cell D, the AT 905 would not send an RUM when visiting cells F because, once in cells F, the traveled distance from originating cell of the AT 905, cell A, does not exceed the RUR 827. If the AT 905 has as an originating cell, cell D, the AT 905 would send an RUM when visiting cell E, thus setting cell E as its originating cell, because, once in cell E, the traveled distance from the originating cell of the AT 905, cell D, does exceed the RUR 827. However, even though the AT 905 crosses the border 950 between the first subnet 910 and the second subnet 920, the AT 905 would not initiate a UATI request because the first subnet 910 and the second subnet 920 are both part of the same subnet group 930. Accordingly, as is discussed above with reference to FIG. 6, the AT will not detect the border 950 as a border separating two subnets.

Further, once the AT sends the RUM in cell E of the second subnet 922, the RUM will be received by the second RNC 922. As is discussed above, the RUR will include a color code indicating the RNC the AT 905 is currently associated with. In this case, since no UATI request has been sent, the AT 905 is still registered with the first RNC 812. In the manner discussed above with reference to FIG. 8B, the second RNC 922 will analyze the RUM and determine that the AT 905 is associated with the first RNC 912 based on the color code in the RUM. Accordingly, the second RNC 922 will forward the RUM to the first RNC 912. For example, the second RNC 822 can forward the RUM to the first RNC 912. Upon receipt of the RUM from the second RNC 922, the first RNC 912 can determine, based on the origin of the RUM, that the AT 905 has traveled outside the first subnet 910. The first RNC 912 can then, autonomously or without a request from the AT 905, facilitate a session transfer for the AT 805 by sending the session information for the AT 905 to the second RNC 922. The second RNC 922 can the assign a UATI to the AT 905 in the manner discussed above in FIGS. 8B and C. As a result, the AT 905 will receive a UATI from the second RNC 922. Thus, the AT 905, which traveled from the first subnet to the second subnet, is properly associated with second RNC 922 without the need for the AT 905 to send a UATI request.

Additionally, once the AT 905 sets the cell E as its originating cell, the AT 905 will not send an RUM when visiting either of cells F, because, once in cells F, the traveled distance from originating cell of the AT 905, cell B, does not exceed the RUR 917. Thus, following the method of providing hand-off hysteresis for subnet borders according to example embodiments, a hysteresis zone, or buffer zone 960 indicated by the dashed lines illustrated in FIG. 9, is created along either side of the border 950. The buffer zone is automatically defined by the RURs of the wireless communication network 900, for example first RUR 917 and second RUR 927. Thus, the ATs within the wireless communications network 900 having the highest likelihood of initiating hand-offs, and thus session transfers, back and forth between the first subnet 910 and the second subnet 920, ATs located in the buffer zone 960, will not initiate a session transfer by traveling to adjacent cells within buffer zone 960, even if the adjacent cells are cells of a neighboring subnet. This is further illustrated by cells B and A in FIG. 9.

Referring to cell B, if the AT 905 has as an originating cell, cell B, the AT 905 would not send an RUM when visiting the cells C in between cells B and A because the traveled distance from originating cell of the AT 905, cell B, would not exceed the RUR 917. However, the AT 905 having as an originating cell, cell B, would send an RUM when visiting cell A, thus setting cell A as its originating cell, because, once in cell A, the traveled distance from the originating cell of the AT 805, cell B, does exceed the RUR 917.

Figure 10:
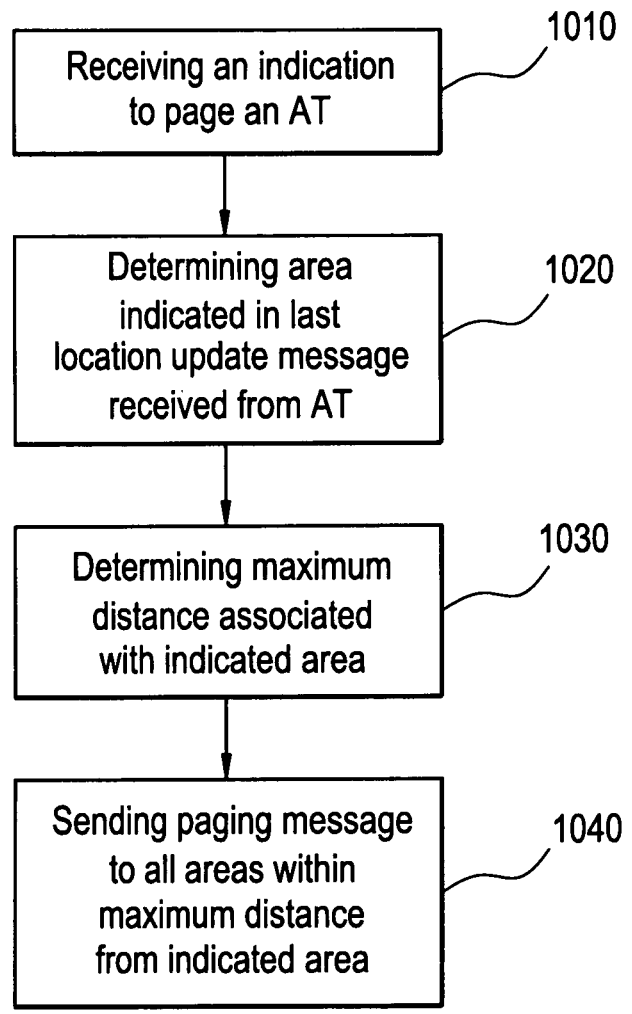
FIG. 10 illustrates a method of paging an AT according to example embodiments.

A method of paging according to example embodiments will now be discussed with reference to FIGS. 9 and 10.
Example Method of Paging an AT FIG. 10 illustrates a method of paging an AT according to example embodiments. The example method illustrated in FIG. 10 will be explained with reference to a scenario in which the AT 905 has sent an RUM from cell E in the second subnet 920 to the second RNC 922, and the AT 905 is attached to cell E.

Referring to FIG. 10, in step 1010, the second RNC 922 receives an indication to page the AT 905 according to known methods.

In step 1020, the second RNC 922 determines the area indicated in the last location update message, for example RUM, received from the AT 905. As is described above with reference to FIGS. 8A and 8B, the second RNC 922 is capable of storing location information, for example longitude and latitude coordinates, received from ATs in the memory unit 856. The second RNC 922 may retrieve the last location indicated by the AT 805 from the memory unit 856 within the second RNC 922.

In step S1030, the second RNC 922 determines the maximum distance associated with the second RNC 922. As is described above with reference to FIGS. 8A and 8B, the second RNC 922 is capable of storing maximum distance parameter, for example an RUR, associated with each of the cells and/or sectors within the subnet of the second RNC 922, the second subnet 920. The second RNC 922 may retrieve the maximum distance parameter from the memory unit 856 within the second RNC 922.

In step S1040, the second RNC 922 sends a paging message based on the determined area and maximum distance parameter. For example, the RNC 922 may send paging messages to all areas that are within the RUR of cell E, including cell E. This group of cells is represented by the shaded cells 970 illustrated in FIG. 9. Further, the second RNC 822 can send a message to the first RNC 812 instructing the first RNC to send paging messages to cells 870 within the first subnet 810.

Thus, the method of providing hand-off hysteresis for subnet borders according to example embodiments creates a buffer zone at the border between subnets of the same subnet group within which session transfers for ATs crossing the border are prevented. Further, even though ATs crossing the border do not send subnet identifier requests, according to example embodiments, controllers are configured to perform session transfers and to assign new subnet identifiers to ATs which move to new subnets. Accordingly, the problems associated with constant hand-offs along borders between neighboring subnets can be avoided.

Further, if an AT within a communications network implementing the method of providing hand-off hysteresis for subnet borders according to example embodiments needs to paged, RNCs within the communications network can limit the number of cells paging messages are sent to cell within the RUR of the least cell from which the AT sent an RUM. Accordingly, when performing a paging operation, the processing load on the RNCs and the amount of traffic generated can be reduced.

Additionally, the method of providing hand-off hysteresis for subnet borders according to example embodiments does not require changes to be made to existing ATs like the secondary color code scheme discussed above with reference to FIG. 5. Accordingly, the method of providing hand-off hysteresis for subnet borders according to example embodiments will be effective for reducing or eliminating ping-ponging at subnet borders even for ATs produced before secondary color code scheme was proposed.

The invention being thus described, it will be obvious that the same may be varied in many ways. Such variations are not to be regarded as a departure from the invention, and all such modifications are intended to be included within the scope of the invention.

What is claimed is:

1. A method of operating a communications network including a plurality of areas divided into at least a first and second subnet, the method comprising:

broadcasting, from a network element, at least one grouping message causing an access terminal (AT) in the communications network to regard the at least first and second subnets as both being members of a same subnet group;

broadcasting from the network element to the AT location information and a maximum distance parameter associated with at least one area from among the plurality of areas, the grouping message and the maximum distance parameter being configured to create a buffer zone along a border between the first and second subnets, the AT being prevented from sending a subnet identifier request message and prevented from sending a location update message when the AT travels such that an origin area of the AT is an area of the first subnet in the buffer zone, a visited area of the AT is an area within both the second subnet and the buffer zone, and a traveled distance of the AT is less than a distance indicated by the maximum distance value, the traveled distance being a distance between the origin area and the visited area, the origin area of the AT being an area the AT was attached to when a last location update was sent, from among the plurality of areas the visited area being an area the AT is currently attached to, from among the plurality of areas.

2. The method of claim 1 wherein the network element is an access network (AN) including at least one controller and at least one base station (BS).

3. The method of claim 2 wherein the controller is a radio network controller (RNC).

4. The method of claim 2 wherein the grouping message includes a plurality of bits divided into a plurality of fields including a controller ID field and a controller group ID field, and wherein broadcasting the grouping message includes broadcasting, from the at least one BS, the grouping message and a mask length indicator indicating a length corresponding to a group of contiguous, most significant bits in the grouping message, not including all of the bits of the controller ID field.

5. The method of claim 2 wherein the at least one area is an area for which the BS provides wireless coverage, and broadcasting the location information and maximum distance parameter includes broadcasting from the at least one BS to the at least one area, the location information and the maximum distance parameter.

6. The method of claim 5 wherein the location information includes longitude and latitude values of a geographical coordinate within the at least one area.

7. The method of claim 1 wherein the communications network follows a code division multiple access (CDMA) evolution data optimized (EVDO) protocol.

8. The method of claim 1 wherein the plurality of areas are each at least one of cells and sectors of cells.

9. The method of claim 1, wherein the maximum distance value is a threshold value for the AT such that while the traveled distance of the AT remains below the threshold value, the AT does not send a location update message to the communications network, and when the traveled distance of the AT exceeds the threshold value, the AT sends a location update message to the communications network.

* * * * *